United States Patent

[11] 3,547,238

| [72] | Inventor | Kenneth B. Harmon<br>Indianapolis, Ind. |
|---|---|---|
| [21] | Appl. No. | 793,818 |
| [22] | Filed | Jan. 24, 1969 |
| [45] | Patented | Dec. 15, 1970 |
| [73] | Assignee | General Motors Corporation<br>Detroit, Mich.<br>a corporation of Delaware |

[54] FREEWHEEL DEVICE
8 Claims, 3 Drawing Figs.

[52] U.S. Cl. .................................................. 192/4.5,
188/82.84
[51] Int. Cl. .................................................. F16d 15/00
[50] Field of Search ........................................... 192/45;
188/82.84

[56] References Cited
UNITED STATES PATENTS

| 2,835,363 | 5/1958 | Long | 192/45 |
| 3,014,567 | 12/1961 | Stockton | 192/45 |
| 3,103,998 | 9/1963 | Watson | 192/45 |

*Primary Examiner* — Allan D. Herrmann
*Attorneys* — Warren E. Finken and F. J. Fodale ABSTRACT: An overrunning roller device has individual spring retainers mounted to the inner race by tangs received in grooves formed in the inner race and overhung by extensions on the roller ramps. The spring retainers are simple stampings and are accurately located with respect to the roller ramps by side plates which are also simple stampings.

PATENTED DEC 15 1970

3,547,238

INVENTOR.
Kenneth B. Harmon
BY
F. J. Fodale
ATTORNEY

FREEWHEEL DEVICE

My invention relates generally to overrunning roller devices and more particularly to overrunning roller devices with individual tickler springs for the rollers.

In such a device, reaction and retention means for the individual tickler springs must be provided and thus my invention is directed to an overrunning roller device which includes individual tickler springs for the rollers and spring retainers and to the spring retainer per se.

Prior devices of this general type have utilized a unitary cage with crossbars supported from one or both end rings to provide the reaction member for the individual springs. These cages may or may not include retention of the springs. The accurate positioning of the crossbars with respect to the roller ramps in such a scheme depends in some measure on the fastening of the crossbars to the end rings. In the alternative prior devices have included individual reaction and/or retention means for each spring related to each individual ramp.

Both of these general schemes have their advantages and drawbacks in obtaining the ultimate goal of having the individual rollers engage and disengage precisely simultaneously in view of the fact that ramp position and dimension, roller diameters, spring retainer dimensions and positions and spring dimensions and rates all vary within manufacturing tolerances.

In its broadest aspect, my invention is directed to providing an overrunning roller clutch in which individual spring reaction members for the individual tickler springs and its attendant advantages are provided and in which the advantages of a unitary cage are incorporated into the overrunning device without some of its attendant disadvantages.

Another object of my invention is to provide such a device in which the individual reaction members also retain the springs.

Another object of my invention is to provide such a device in which the spring retainers are especially adaptable for use with accordion-shaped springs and prevent their buckling by retaining the springs within certain radial limits.

Another object of my invention is to provide an overrunning roller device having individual spring retainers in which the spring retainers are simple in design providing ease and economy of manufacture.

Another object of my invention is to provide an overrunning roller device having individual spring retainers which are assembled to the ramped race of the overrunning roller device in a simple and efficient manner.

Another object of my invention is to provide such as overrunning roller device in which the spring retainers are assembled to the ramped race in such a manner so as to be restrained from working loose from vibration.

Another object of my invention is to provide an overrunning roller device having individual spring retainers which are accurately located with respect to the ramps by a member comprising a simple stamping.

Another object of my invention is to provide a spring retainer for use with an overrunning roller a device which is of simple and economical design being fabricated from a strip of sheet stock.

With these and other objects in view, as will hereinafter more fully appear, and which will be more particularly pointed out in the appended claims, reference is now made to the following description taken in connection with the accompanying drawings in which:

Figure 1:
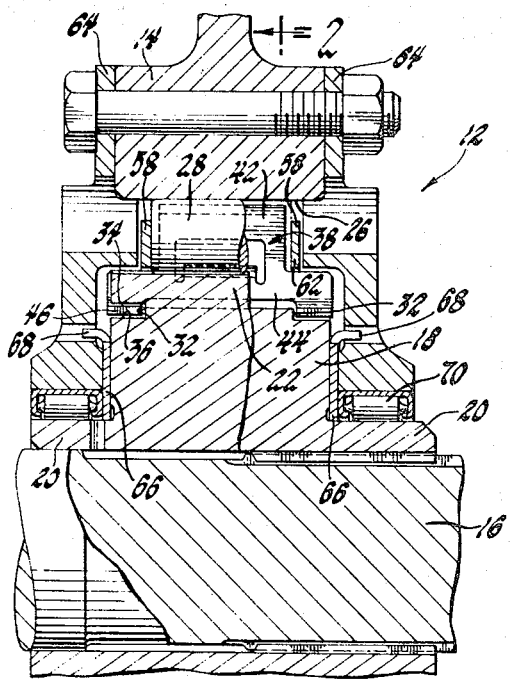
FIG. 1 is a section taken through the axis of an overrunning roller device in with my invention.

Referring now to the drawings and more specifically to FIG. 1, the overrunning roller device indicated generally at 12 has its outer race 14 conveniently provided by a bored wall in a transmission housing or the like with which my overrunning device can be utilized. In this particular disclosure, the overrunning device is used as a one-way brake for the shaft 16 as the outer race 14 or reaction member is stationary, however, it is to be understood that my invention is equally applicable to an overrunning roller clutch in which a rotatable member in one direction and allowed to overrun or rotate relatively to the second member in the opposite direction. Splined to the shaft 16 is an inner race 18 which includes flanges 20 adjacent the shaft to provide a bearing surface as will hereinafter more fully be explained.

Figure 2:
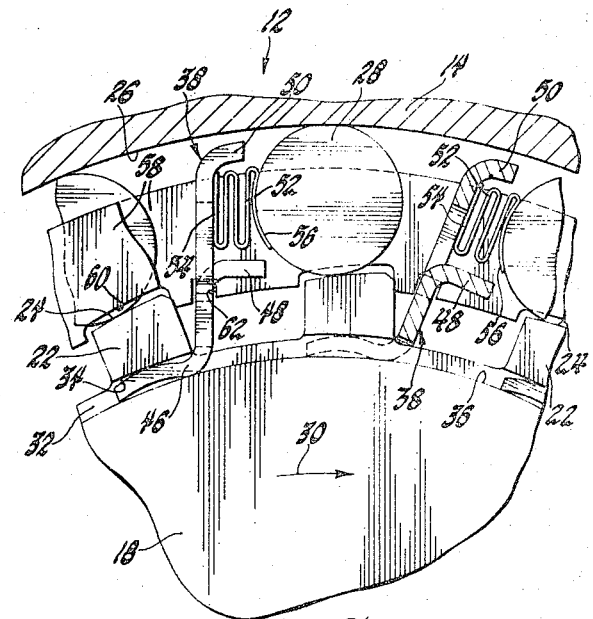
FIG. 2 is a section taken along the line 2-2 of FIG. 1 and looking in the direction of the arrows.

A number of circumferentially spaced ramps 22 extend radially from the inner race 18 as can more clearly be seen in FIG. 2. The ramps include surfaces 24 which converge toward the cylindrical surface 26 provided by the bore of the outer race 14. The convergence is such that the plurality of rollers 28 which engages the converging surfaces 24 on the ramps 22 and the cylindrical surface 26 on the outer race 14 allows rotation of the inner race 18 in the clockwise direction indicated by the arrow 30 and prevents rotation of the inner race in the opposite or counterclockwise direction.

A circumferential groove 32 is provided in each axial end portion of the inner race 18. As illustrated in FIG. 1, the outboard portions of the inner race 18 in which the axially spaced circumferential grooves 32 are located extend outside of the area of the ramps 22 which carry a load through the rollers 28. The grooves 32 open radially toward the outer race except in the areas where the ramps 22 overhang the grooves 32. An abutment surface 34 on the underside of the overhanging ramp portion confronts the circumferential surface 36 of each groove.

Figure 3:
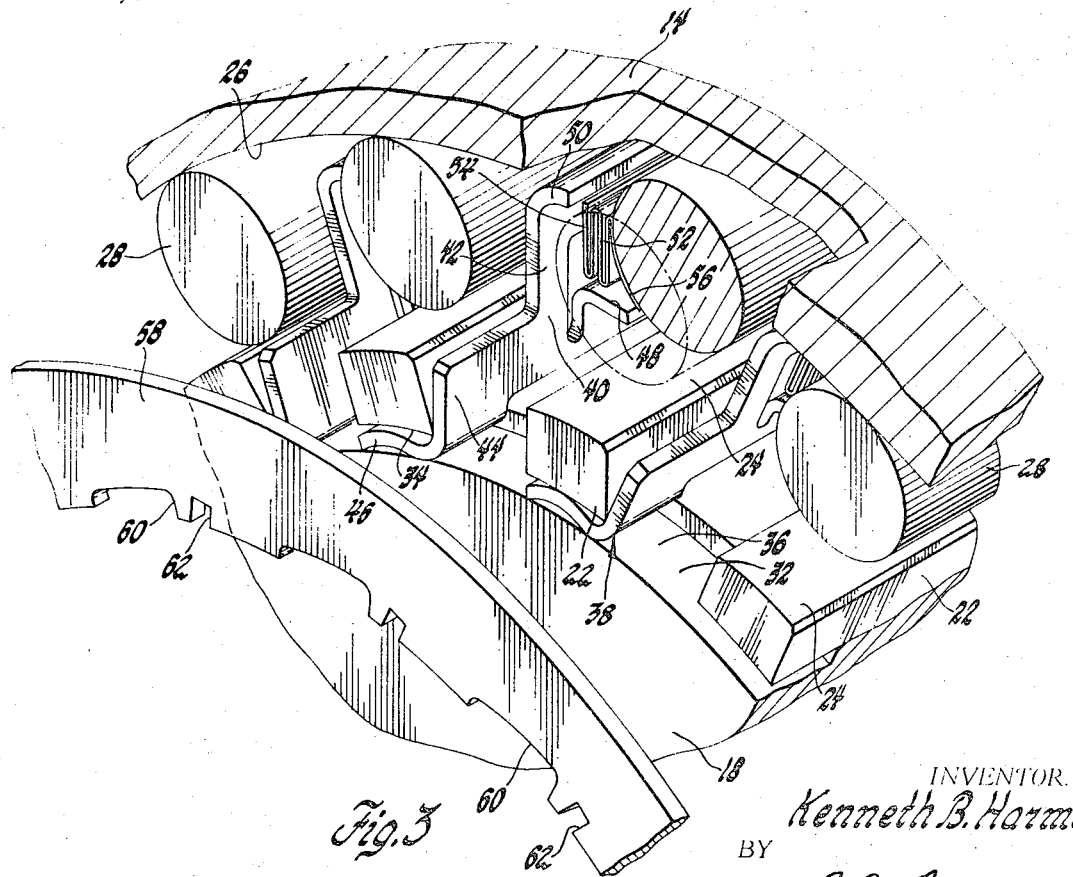
FIG. 3 is a perspective view of the overrunning device shown in FIGS. 1 and 2 with the side plate exploded away to show the interrelationship of the rollers, springs, spring retainers, and ramped race.

With each of the ramps 22 is associated a spring retainer indicated generally at 38. The structure of the spring retainer is best understood in reference to FIG. 3. It comprises a sheet metal body 40 having a portion 42 which in radial direction corresponds roughly to the area occupied by the roller 28 and which in the axial direction is narrower than the roller. The portion 44 in the ramp area is widened and substantially coextensive with the ramps 22 including their axial extensions which overhang the grooves 32. A pair of tangs 46 depend from the radially inner end of the retainer body 40 and extend circumferentially. The tangs are preferably formed by bending integral extensions on the retainer body. In their assembled position, the tangs 46 straddle the portion of the inner race between the grooves 32 and are disposed in the grooves 32 between the circumferential surfaces 36 and the abutment surfaces 34 on the underside of the ramp 22 with which the spring retainer is associated. The tangs 46 are preferably arcuate in cross section and preferably have an interference fit between the circumferential surfaces of the grooves and the abutment surfaces of the associated ramp so that the tangs are elastically deformed and thus the spring retainer is restrained from vibration.

The spring retainers 38 include a first tongue 48 which is sufficiently spaced radially from the grooves 32 and so related to the ramps 22 such that a spring retainer is radially insertable into the space between a pair of adjacent ramps 22 until the tangs engage the circumferential surfaces 36 of the grooves 32. The spring retainer is then circumferentially indexable into the position shown in the drawings where the tangs are retained in the grooves by the ramp extensions. The tongue 48 is preferably formed by cutting and bending out a portion of the body 40 of the spring retainer. The radially outward end of the spring retainer 38 is bent over to provide a second tongue 50.

The tongues 48 and 50 extend away from the ramp with which the spring retainer is associated toward the ramp ahead of the associated ramp. An accordion-shaped tickler spring 52 is provided between each spring retainer 38 and a roller 28 engaging the ramp ahead of the associated ramp. The accordion-shaped spring 52 has its reaction end 54 abutting the body portion of the spring retainer between the tongues 48 and 50. Thus the spring retainers 38 not only provide the reaction member for the springs 52 but also retain them in the sense that they limit the radial movement of the springs and prevent their buckling under sever overrunning of the device. The opposite end 56 of the spring is preferably particircular and conforms to and engages the roller 28.

A side plate 58 is provided adjacent each of the end surfaces of the rollers as can be seen in FIG. 1.

Returning to FIG. 3, the side plate 58 comprises a simple annular stamping which includes a number of circumferentially spaced slots 60 alternated with slots 62 in its inner margin. The slots 60 are similar in contour to the ramp extensions while the slots 62 are similar in contour to the outline of the widened portion 44 of the spring retainer body 40. The slots 60 and 62 are so placed in the inner margin of the side plates 58 so that when the side plates are in the position shown in FIG. 2, the ramp extensions and the widened portions of the spring retainer bodies protrude into the slots 60 and 62, respectively, whereby the side plates 58 accurately locate the spring retainers with respect to the ramps.

Returning to FIG. 1, the side plates are maintained in assembly with the ramps 22 and the spring retainers 38 by flange pieces 64 which are bolted to the outer race 14. The flange pieces extend slightly into the annular space between the inner race and the outer race to limit the axial movement of the side plates 58 so that they do not come out of assembly with the ramps and the spring retainers. A plain thrust washer 66 is secured to the inner circumferential margin of each of the flange pieces 64 to provide a thrust bearing surface between the rotatable inner race 18 and the fixed outer race 14. In the particular device illustrated, the thrust bearings 66 include tabs 68 which are received in apertures in the flange pieces 64 to mount the thrust washers 66 to the flange pieces 64. A needle roller package bearing 70 is mounted in the bore of each of the flange pieces 64. Their rollers engage the bearing surfaces provided by the flanges 20 on the inner race to center the inner race 18 within the outer race 14.

The operation of my overrunning device which in this particular disclosure is a brake is as follows. The outer race 14 being fixed, the inner race 18 and its shaft 16 are rotatable in the clockwise direction as indicated by the arrow 30 in FIG. 2. In this mode of operation, the accordion springs 52 urge each of the rollers 28 up the ramp surfaces 24 into light skidding engagement with cylindrical surface 26 on the outer race 14. Should the inner race 18 and shaft 16 attempt to rotate in the counterclockwise direction, however, the rollers 28 lockup between the ramp surfaces 24 and the cylindrical surface 26 to brake the inner race 18 and shaft 16. It is to be noted that the function of the accordion-shaped tickler springs 52 is to insure lockup engagement of all of the rollers 28 substantially simultaneously. While the particular disclosure is a brake, the principles of my invention are equally applicable to an overrunning roller clutch.

I wish it to be understood that I do not desire to be limited to the exact details of construction shown and described, for obvious modifications will occur to a person skilled in the art.

I claim:

1. An overrunning roller device comprising:
   first and second substantially coaxially aligned races;
   one of said races having a plurality of spaced, radially protruding ramps;
   a roller engaging each ramp and a generally cylindrical surface on said other race;
   a pair of axially spaced circumferential grooves in said one race opening radially toward said other race, said ramps having portions overhanging said grooves;
   an abutment surface on said ramp portions confronting a circumferential surface of said grooves;
   a spring retainer associated with each ramp, each of said spring retainers comprising a generally radially-oriented body, said body having a pair of spaced, depending, generally circumferential tangs disposed in said grooves, respectively, and engaging said abutment surfaces and said circumferential surfaces;
   a first tongue on said body extending away from associated ramp;
   a second tongue on said body radially spaced from said first tongue and extending away from said associated ramp;
   a spring engaging each of said bodies of said retainers between said tongues and a roller engaging a ramp ahead of said associated ramp;
   a side plate adjacent each end face of said rollers, each of said side plates having slots in its circumferential margin, said ramps and said spring retainers protruding into said slots whereby said side plates locate said spring retainers with respect to said ramps; and
   flange means depending from one of said races in juxtaposition to said side plates to limit their axial movement and retain said side plates in assembly with said one race and said spring retainers.

2. The overrunning roller device as defined in claim 1 wherein said radially protruding ramps are spaced and said tangs are dimensioned such that said each spring retainer is radially receivable between a pair of adjacent ramps and circumferentially indexable to a position where said tangs are disposed in said grooves with said tangs engaging said abutment surfaces on said ramp portions and circumferential surfaces in said grooves.

3. The overrunning roller device as defined in claim 1 wherein said tangs are arcuate and biased between said abutment surfaces on said ramps and said circumferential surfaces in said grooves whereby said spring retainers are restrained from vibration.

4. The overrunning roller device as defined in claim 1 wherein said springs are accordion-shaped with one end abutting said retainer body between said tongues and the opposite end terminating in a particircular portion conforming to and engaging a roller.

5. An overrunning roller device comprising:
   first and second substantially coaxially aligned races;
   a plurality of spaced radially protruding ramps on one of said races;
   a roller engaging each ramp and a generally cylindrical surface on said other race;
   a pair of spaced circumferential grooves in said one race opening radially toward said other race;
   an axial extension of each end of each of said ramps overhanging one of said grooves;
   an abutment surface on each of said extensions remote from said other race and confronting a circumferential surface of one of said grooves;
   a spring retainer associated with each ramp, each of said spring retainers comprising a generally flat radially-oriented body, said body having a widened portion substantially coextensive with said ramp and its extensions;
   a pair of spaced arcuate tangs extending generally circumferentially from said widened portion, said tangs being disposed in said grooves, respectively, and engaging said abutment surfaces and said circumferential surfaces;
   a first tongue bent out of said body and extending away from said associated ramp;
   the end of said body remote from said widened portion terminating a second tongue bent from said body, said second tongue being radially spaced from said first tongue and extending away from said associated ramp;
   a spring engaging each of said bodies of said retainers between said tongues and each of said rollers;
   a side plate adjacent each end face of said rollers;
   a plurality of slots in the margin of said side plates, each of said extensions and the widened portions of said plates, each of said extensions and the widened portions of said spring retainers protruding into said slots whereby said side plates locate said spring retainers with respect to said ramps; and
   flange means depending from one of said races in juxtaposition to said side plates to limit their axial movement and retain said side plates in assembly with said spring retainers and said one race.

6. The overrunning roller device as defined in claim 5 wherein said springs are accordion-shaped having one end engaging said retainer body between said tongues and the opposite end terminating in a particircular portion conforming to and engaging a roller.

7. The overrunning roller device as defined in claim 6 wherein said radially protruding ramps are spaced and said tangs are dimensioned such that said each spring retainer is radially receivable between a pair of adjacent ramps and circumferentially indexable to a position where said tangs are disposed in said grooves with said tangs engaging said abutment surfaces on said ramp portions and circumferential surfaces in said grooves, and wherein said tangs are elastically deformed when positioned between said abutment surfaces on said ramps and said circumferential surfaces in said grooves to restrain said spring retainer from vibration.

8. A spring retainer for an overrunning roller device associated with a ramp of a race of said overrunning roller device, each of said spring retainers comprising a generally flat body including a widened portion;

a pair of spaced arcuate tangs integral with and protruding angularly from the end of said widened portion in a first direction;

a first tongue bent out of said body and extending away from said body in the opposite direction; and the end of said body remote from said widened portion terminating a second tongue bent from said body, said second tongue being radially spaced from said first tongue and extending away from said body in said opposite direction.

PO-1050
(5/69)

UNITED STATES PATENT OFFICE
CERTIFICATE OF CORRECTION

Patent No. 3,547,238         Dated December 15, 1970

Inventor(s) Kenneth B. Harmon

It is certified that error appears in the above-identified patent and that said Letters Patent are hereby corrected as shown below:

In the Specification:
Column 1, line 56, delete "a";
Column 1, line 65, after "in" insert
--accordance--;
Column 2, line 5, after "member" insert
--is locked up with a second rotatable member--;
Column 2, line 35, after "in" insert --the--.

In the Claims:
Claim 5, lines 64 and 65, delete "each of sai extensions and the widened portions of said plate

MAR. 9,1971

(SEAL)
Attest:

Edward M. Fletcher, Jr.
Attesting Officer

WILLIAM E. SCHUYLER,
Commissioner of Pate